Oct. 20, 1959  C. G. BOUDETTE  2,909,288
DRILL STEEL SUPPORTING AND STORING DEVICE
Filed Sept. 16, 1955  9 Sheets-Sheet 1

Inventor:
Cornelius C. Boudette
Deceased
Mary C. Boudette
Executrix
by
Charles F. Osgood,
attorney.

Oct. 20, 1959     C. G. BOUDETTE     2,909,288
DRILL STEEL SUPPORTING AND STORING DEVICE
Filed Sept. 16, 1955     9 Sheets-Sheet 3

Oct. 20, 1959 — C. G. BOUDETTE — 2,909,288
DRILL STEEL SUPPORTING AND STORING DEVICE
Filed Sept. 16, 1955 — 9 Sheets-Sheet 5

Fig. 2c.

Inventor:
Cornelius G. Boudette
Deceased.
Mary E. Boudette,
Executrix.
By Charles F. Osgood,
Attorney.

Inventor:
Cornelius G. Boudette
Deceased.
Mary E. Boudette
by Executrix.
Charles F. Osgood,
Attorney.

Oct. 20, 1959 C. G. BOUDETTE 2,909,288
DRILL STEEL SUPPORTING AND STORING DEVICE
Filed Sept. 16, 1955 9 Sheets-Sheet 7

Inventor:
Cornelius C. Boudette
Deceased.
Mary E. Boudette.
Executrix.
by Charles F. Osgood,
attorney.

Oct. 20, 1959                C. G. BOUDETTE                 2,909,288
                  DRILL STEEL SUPPORTING AND STORING DEVICE
Filed Sept. 16, 1955                                  9 Sheets-Sheet 8

Inventor:
Cornelius G. Boudette
     Deceased.
Mary E. Boudette
   Executrix
By
Charles F. Osgood,
      Attorney.

United States Patent Office 2,909,288
Patented Oct. 20, 1959

2,909,288

DRILL STEEL SUPPORTING AND STORING DEVICE

Cornelius G. Boudette, deceased, late of Claremont, N.H., by Mary E. Boudette, executrix, Claremont, N.H., assignor to Joy Manufacturing Company, Pittsburgh, Pa., a corporation of Pennsylvania Application September 16, 1955, Serial No. 534,848

19 Claims. (Cl. 211—60)

This invention relates to an article storage and handling device and more particularly to a storage and handling device for drilling implements such as rock drill steels.

In rock drilling machines for drilling upright holes of substantial depth the drill steel sections are relatively long and heavy making it difficult for manual handling. In the present invention the drill steel sections are carried by a rotary rack of an improved design, mounted on the drilling machine, whereby the drill steel sections may be quickly and expeditiously moved into and out of position on the machine, thereby substantially to reduce the need for manual handling of the drill steel sections.

An object of the present invention is to provide an improved loading device for drilling implements such as rock drill steels. Another object is providing an improved storage and handling device for rock drill steels whereby the latter may be readily moved into and out of position on the machine. Yet another object is to provide an improved rotary rack for the drill steels of a rock drill whereby the drill steels may be stored on the machine and may be readily handled during addition of drill steel sections to or removal of drill steel sections from the drill string. These and other objects and advantages of the invention will however hereinafter more fully appear.

In the accompanying drawings there are shown for purposes of illustration one form and a modification which the invention may assume in practice.

In these drawings.

In the illustrative embodiment of the invention, as shown in the drawings, the improved drill steel loading device generally designated 1 is shown associated with a conventional rock drilling machine generally designated 2.

The drilling machine may assume various forms but herein comprises a mobile base 3 desirably mounted on crawler treads, and carrying a tower or mast 4 supporting an upright guide 5 along which a drilling tool 6 is guided for vertical movement. The tool 6 is desirably of the pneumatic hammer type having a motor casing 7 provided with a front chuck housing 7' in which a conventional drill steel 8 is suitably loosely reciprocably supported. The drill steel is of conventional form and has a usual rear shank 8' and a winged drill bit 9 attached to its front or lower end. Any suitable power operated means, such as a chain feed 10, may be employed to feed the drilling tool along the guideways of the guide. Evidently the loading device of the present invention may be associated with machines of other types and may be employed with articles other than drill steels.

Figure 10:
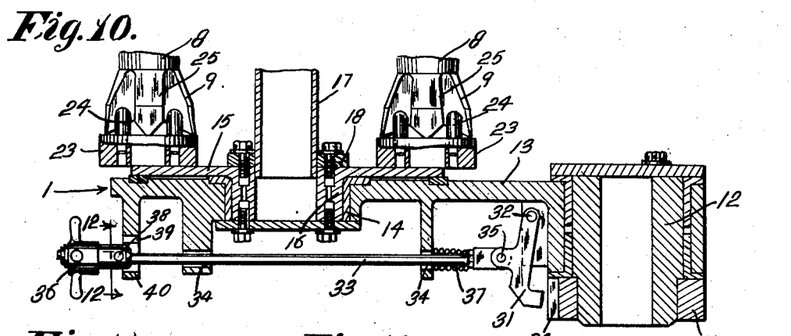
Fig. 10 is a section taken on the plane of Fig. 6 showing the latch in released position.
Figures 11, 12, 13:
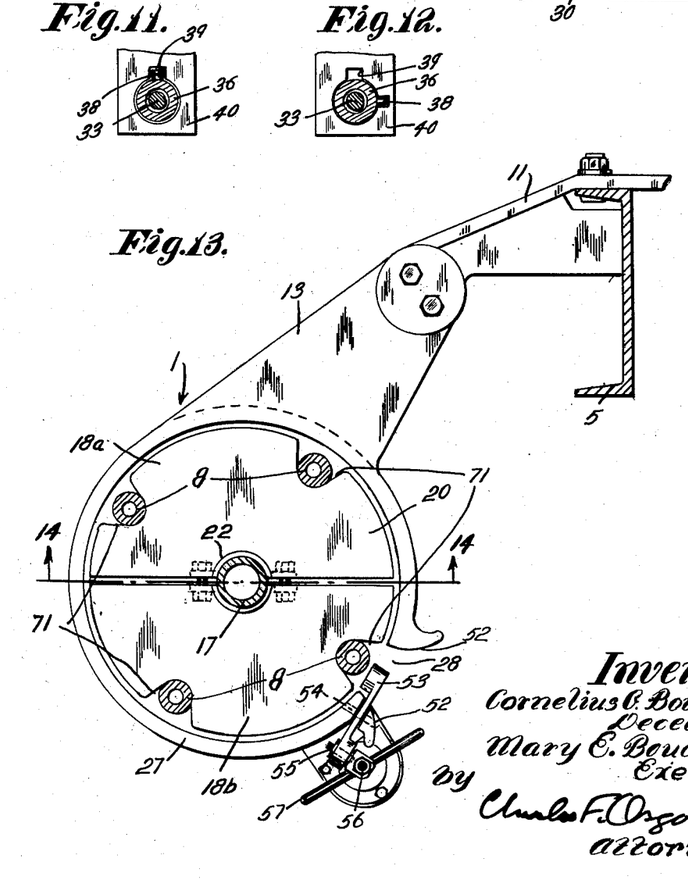
Fig. 11 is an enlarged detail section taken on line 11—11 of Fig. 6.
Fig. 12 is a section similar to Fig. 11, showing parts in a different position.
Fig. 13 is an enlarged horizontal section taken on line 13—13 of Fig. 2c, showing the intermediate support.
Figures 14, 15, 16, 17:
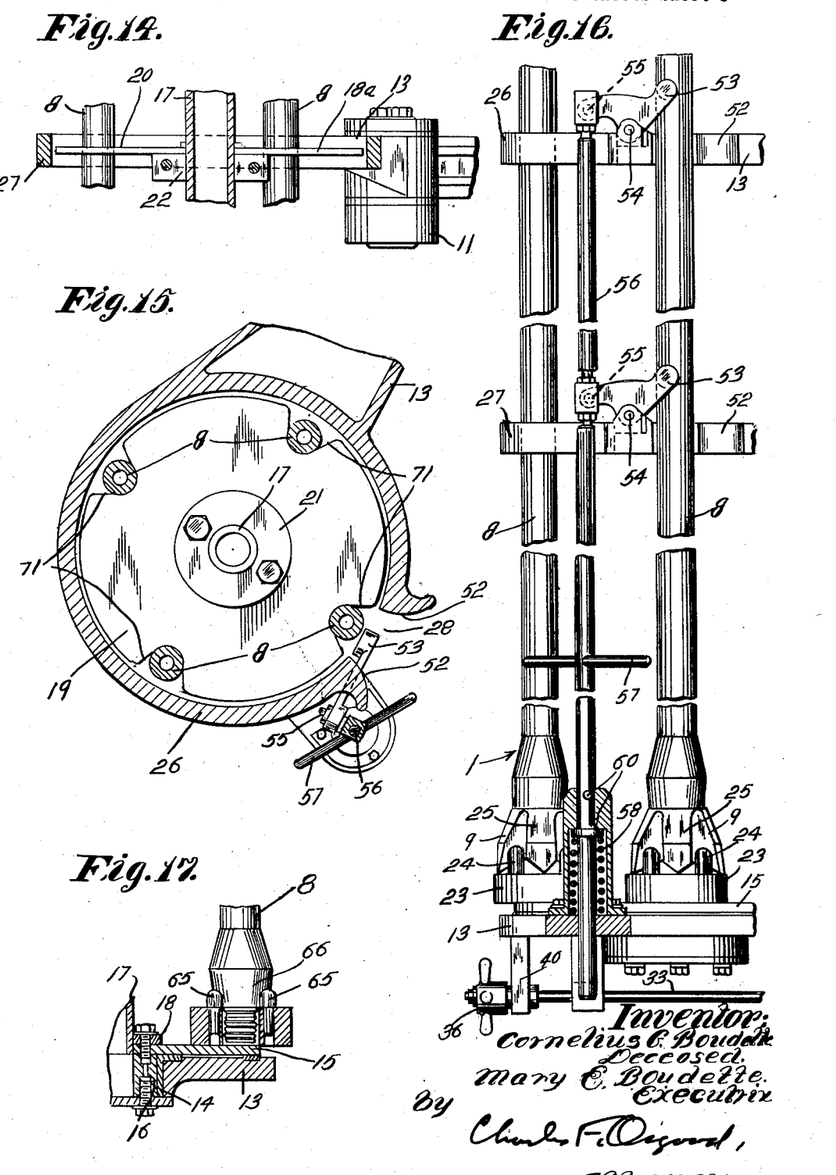
Fig. 14 is a detail vertical section taken on line 14—14 of Fig. 13.
Fig. 15 is an enlarged horizontal section taken on line 15—15 of Fig. 2b.
Fig. 16 is an enlarged detail vertical section taken on line 16—16 of Fig. 1.
Fig. 17 is a vertical section taken on the plane of Fig. 6, showing a modified construction.

Now referring to the detail structure of the loading device 1 it will be noted that carried on the mast or tower of the drilling machine at one side of the vertical guide 5 are brackets 11 supporting vertical pivot pins 12 (Figs. 6 and 10) on which three superimposed arms 13 are pivotally mounted for horizontal swinging movement. Journaled on a vertical axis on a bearing 14 carried by the lower swinging arm is a rotary member 15 in the form of a circular plate or disk provided with a hub 16 engaging the bearing. A tubular support 17 is centrally located at its lower end as by welding to a flange 18 bolted to the bottom plate. Arranged coaxially in superimposed relation with respect to the bottom plate 15 are upper and intermediate disks 19 and 20 (Figs. 13 and 15) and the upper end of the tubular support 17 is secured as by welding to a top flange 21 in turn secured as by bolts to the upper disk 19. The intermediate disk 20 is desirably composed of two parts 18a and 18b attached as by a clamp 22 to the tubular support 17 (Figs. 13 and 14). The upper disk is journaled within the upper swingable arm 13 in a manner similar to that of the lower disk shown in Fig. 6. Thus the three superimposed plates or disks 15, 19 and 20 may rotate in unison with the tubular support 17.

The superimposed disks and connecting tubular support cooperate to provide a rotary rack turnable about a vertical axis at A and mounted to swing horizontally along an arcuate path at B (Fig. 5) and this rack is adapted to carry a load of elongated drill steels on the drilling machine. The rotary rack may be rotated and swung arcuately to bring the drill steels thereon progressively into position on the machine or progressively to move the steels out of position thereby to enable additional steels to be attached to the drill string or to be detached therefrom as desired.

Figures 5, 6:
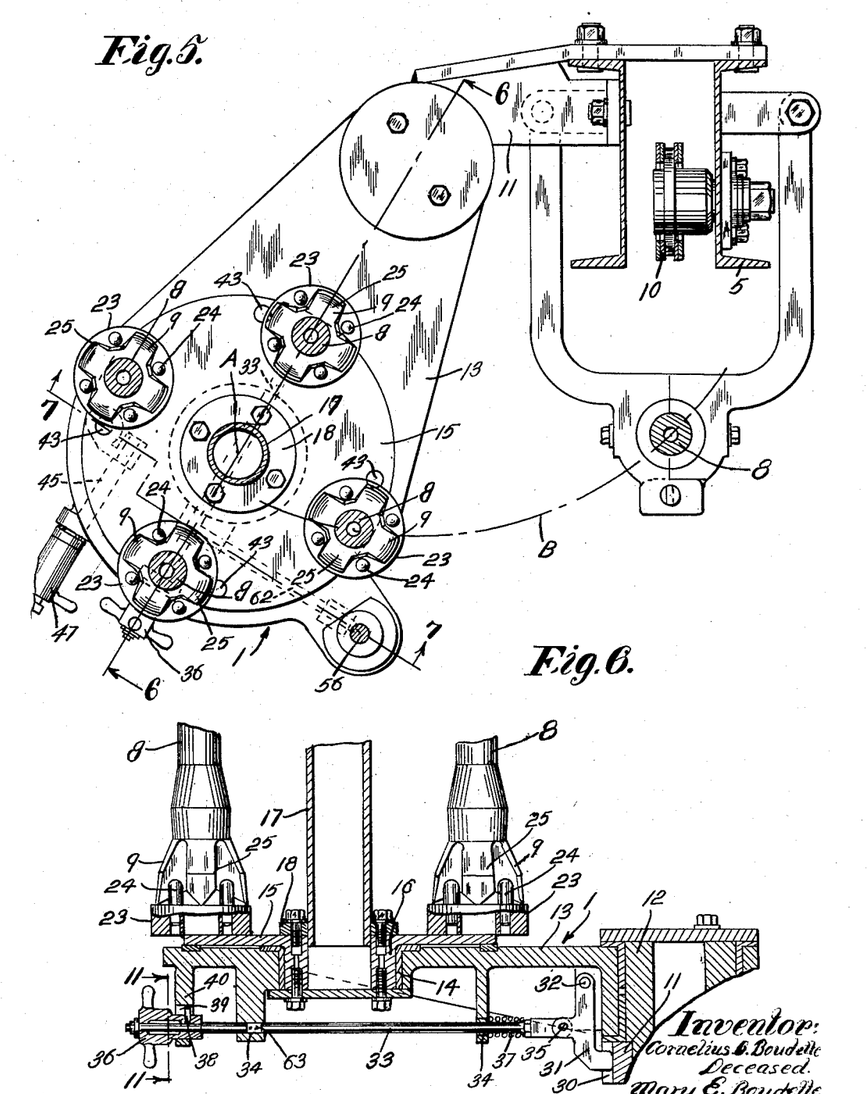
Fig. 5 is an enlarged horizontal section taken on line 5—5 of Fig. 2c.
Fig. 6 is a detail vertical section taken on line 6—6 of Fig. 5, with the rack-latch in locking position.

The bottom disk or plate 15 is in the form of a rotary table and carries a series of circular plates or rest pads 23 which are spaced equidistantly about its periphery (Fig. 5). The drill steels may have their bit-ends rest on these pads in the manner shown and vertically located pins 24 secured to the pads are arranged at the corners of the bit-wings 25 for positioning the bits on the pads.

Secured respectively to the upper and intermediate swingable arms 13 are retaining means in the form of retaining rings or annuli 26 and 27 each open at one side at 28 so that the drill steels may be inserted laterally within the rings or removed from the rings. The intermediate retaining ring is shown in Fig. 13 and the upper or top retaining ring is shown in Fig. 15. As illustrated, four drill steels may be loaded onto the rotary rack although, evidently, the number of drill steels may be varied as desired. Also the rack is designed to receive drill steels of varying length.

Figures 8, 9:
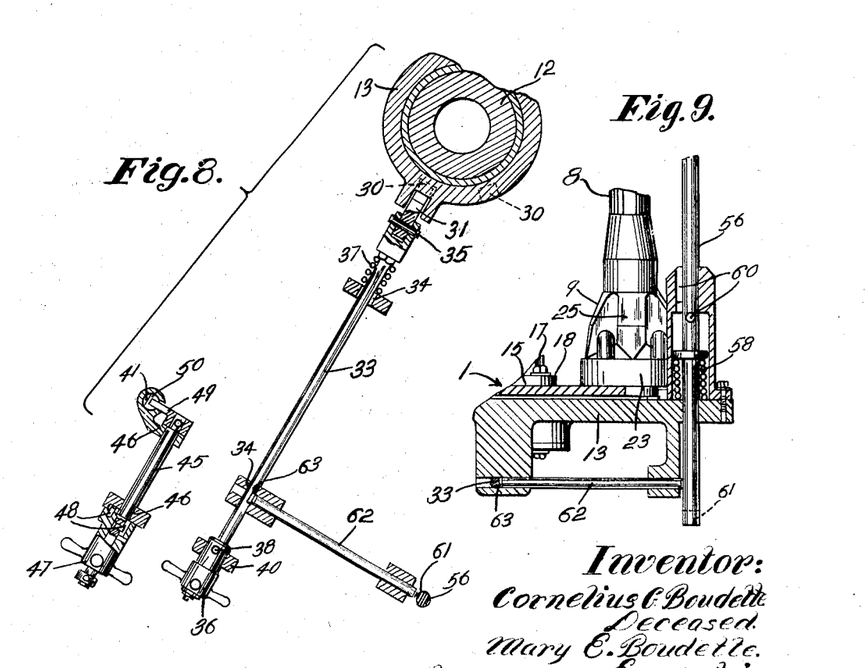
Fig. 8 is an enlarged horizontal section taken on line 8—8 of Fig. 2c.
Fig. 9 is a fragmentary section taken on the plane of Fig. 7, showing the latch in a different position.

The swingable arms 13 may be locked in different positions about their pivots to locate the rotary rack in loading and unloading positions and this may be accomplished in various manners, but, in this instance, the arm brackets 11 each have circumferentially spaced, radially located, vertical notches or grooves 30 (Fig. 6) for receiving a latch 31 pivoted at 32 on the lower arm. Extending radially with respect to the arm pivot, as shown in Figs. 8 and 10, is a horizontal operating rod 33 which is guided at 34 on the lower arm for endwise shifting movement and this rod is pivotally connected at 35 to the latch. A handle 36 is rotatively connected to the outer end of the rod and a coil spring 37, surrounding the rod, constantly urges the latch inwardly toward locking position. A bayonet type lock is provided for holding the operating rod either in or out and this lock comprises a pin 38 on the handle and insertible through a notch or slot 39 on a depending lug 40 on the lower arm. Fig. 6 shows the pin of the bayonet lock passing through the notch or slot while Fig. 10 shows the pin in position to lock the rod in its outermost latch-releasing position. Of course, when the pin is turned through 90° behind the lug 40 and out of registry with the slot (Fig. 12) the latch is held in unlocked position.

Figure 7:
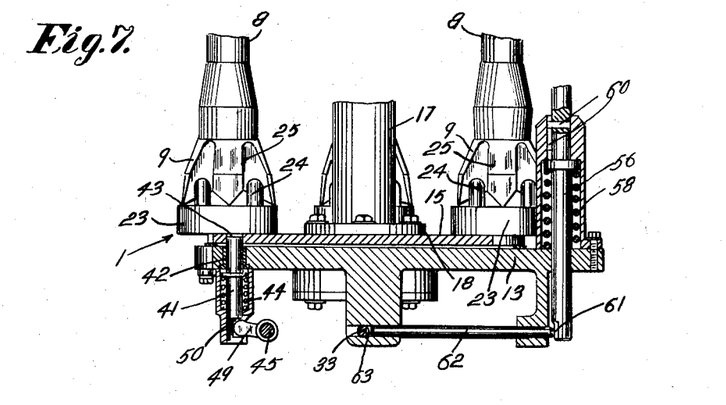
Fig. 7 is a detail vertical section taken on the planes of lines 7—7 of Fig. 5.

The lower rotary plate or turntable-disk 15 may be locked to the lower or bottom swingable arm 13 to hold the drill steel rack against rotation about its own axis, and the locking means for accomplishing this may likewise assume various forms. Herein, as shown in Figs. 5, 7 and 8, a vertical locking plunger or rod 41 is guided in a bearing bushing 42 suitably supported within the lower arm 13 and apertures 43 are suitably spaced apart equidistantly on the rotary disk 15 to provide four locking positions, are progressively registerable with the plunger 41 so that the latter may be shifted upwardly into locking position within an aperture. A coil spring 44 constantly urges the plunger upwardly toward locking position. A rotary operating rod 45 is journaled at 46 on the lower arm 13, and a handle 47 is rotatively and slidingly mounted on the outer portion of this rod (Fig. 8). A bayonet pin and groove lock 48 is provided for this handle to hold the operating rod 45 in its different positions of adjustment. Secured to the inner end of the rod 45 is a lever arm 49 engaged in a notch or side recess 50 in the adjacent side of the locking plunger 41 (Fig. 7). Thus the handle 47 may be manually operated to bring the locking plunger into its desired aperture in the lower turntable plate 15 to lock the rack against rotation.

The upper and intermediate retaining rings, as shown in Figs. 13 and 15, have oppositely curved guide portions 52 to provide widened mouths for the ring-openings for directing the drill steels laterally within the rings through the open sides of the latter, and shiftable retaining members or gates 53 are provided for closing the open sides of the rings to prevent undesired lateral outward release of the drill steels from the rack. These gates are pivoted at 54 on the rings and are pivotally engaged at 55 with a vertical operating rod 56 suitably guided for axial movement on the rotary rack (Fig. 16). A handle 57 is secured to this rod for shifting the latter and a coil spring 58 constantly urges the rod in an upward direction to move the gates toward closed position, as shown (see also Figs. 13 and 15).

The operating rod 56 is also rotatable and a bayonet pin and slot type lock 60 (Fig. 9) may serve to hold the rod in its lowered gate-releasing position. Formed on the lower portion of the rod is a cam surface 61 with which a horizontal locking plunger 62 coacts, and the cam may be turned to shift the plunger 62 into locking engagement with a notch 63 in the operating rod 33 and the locking latch 31 then holds the swingable arms 13 against swinging movement. Thus when the gates 53 are located in released position the arms 13 may be locked against swinging movement.

In the modification shown in Fig. 17 vertical pins 65 on the rest pads of the lower turntable plate 15 engage the sides of a threaded coupling end 66 of the drill steel, instead of the bit-end, to position the drill steel on the rack-turntable.

Figure 1:
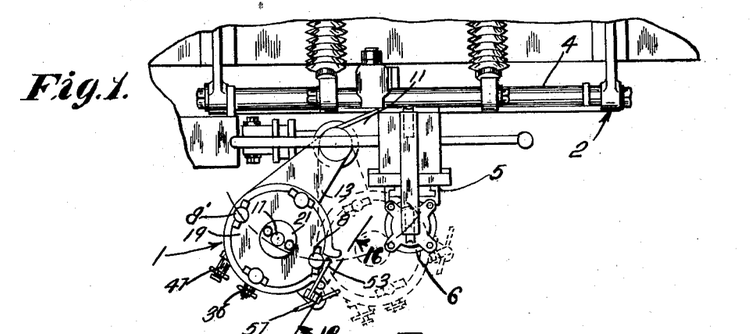
Fig. 1 is a top plan view of a drill steel loading device constructed in accordance with a preferred embodiment of the invention and showing a portion of the associated drilling machine on which the loading device is mounted.
Figure 2A:
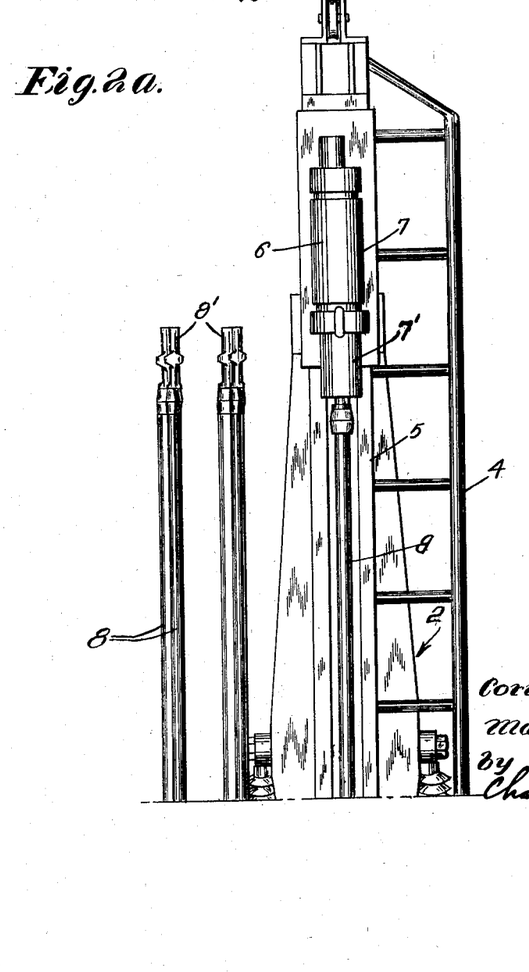
Figs. 2a, 2b and 2c, taken together, constitute a front elevational view of the improved loading device and the associated drilling machine.
Figure 2B:
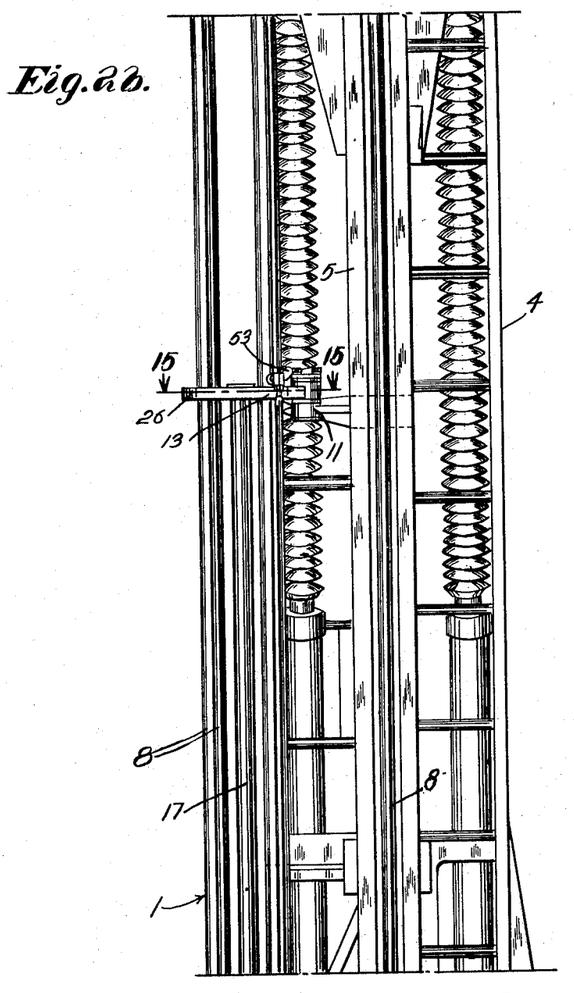
Figure 2C:
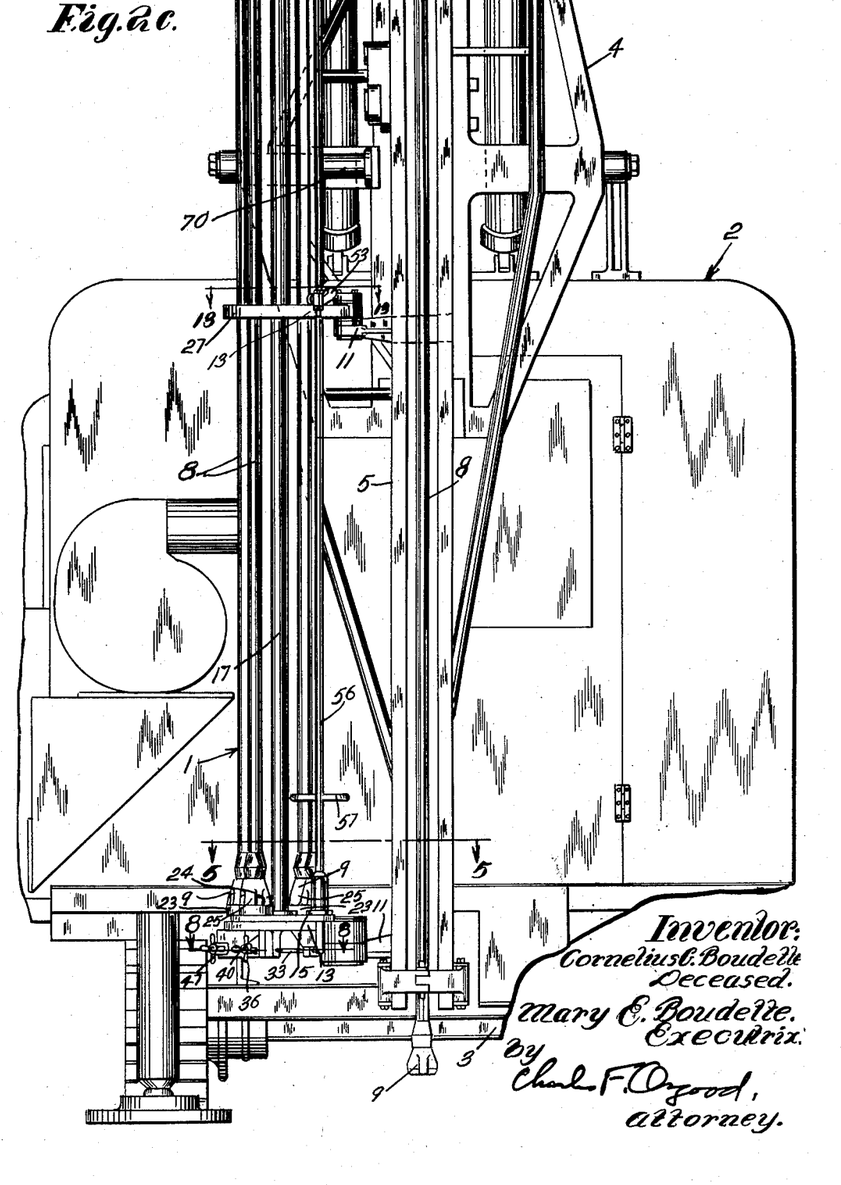
Figure 3A:
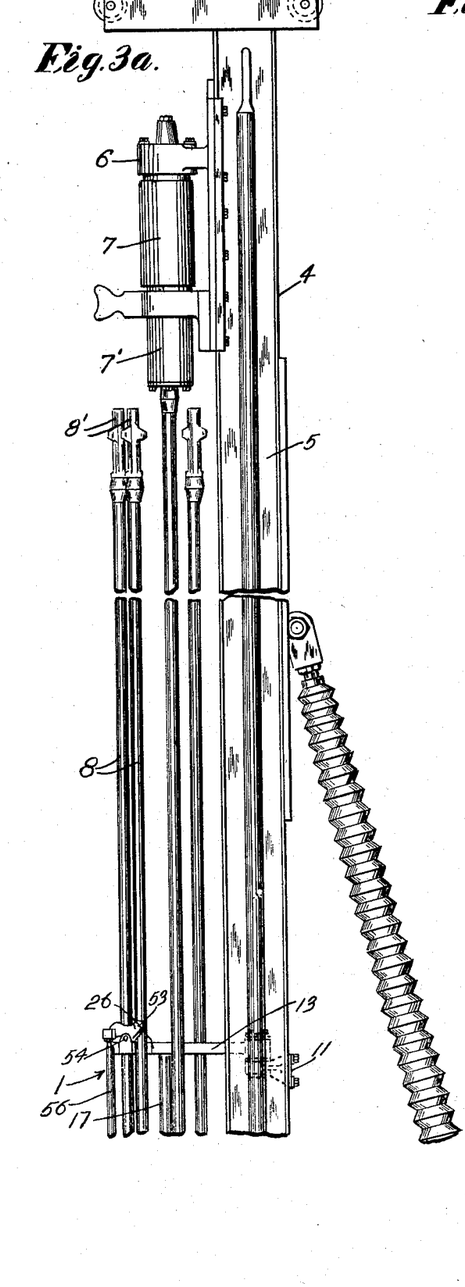
Figs. 3a and 3b, taken together, constitute a side elevational view of the loading device and the associated drilling machine shown in Figs. 2a, 2b and 2c.
Figure 3B:
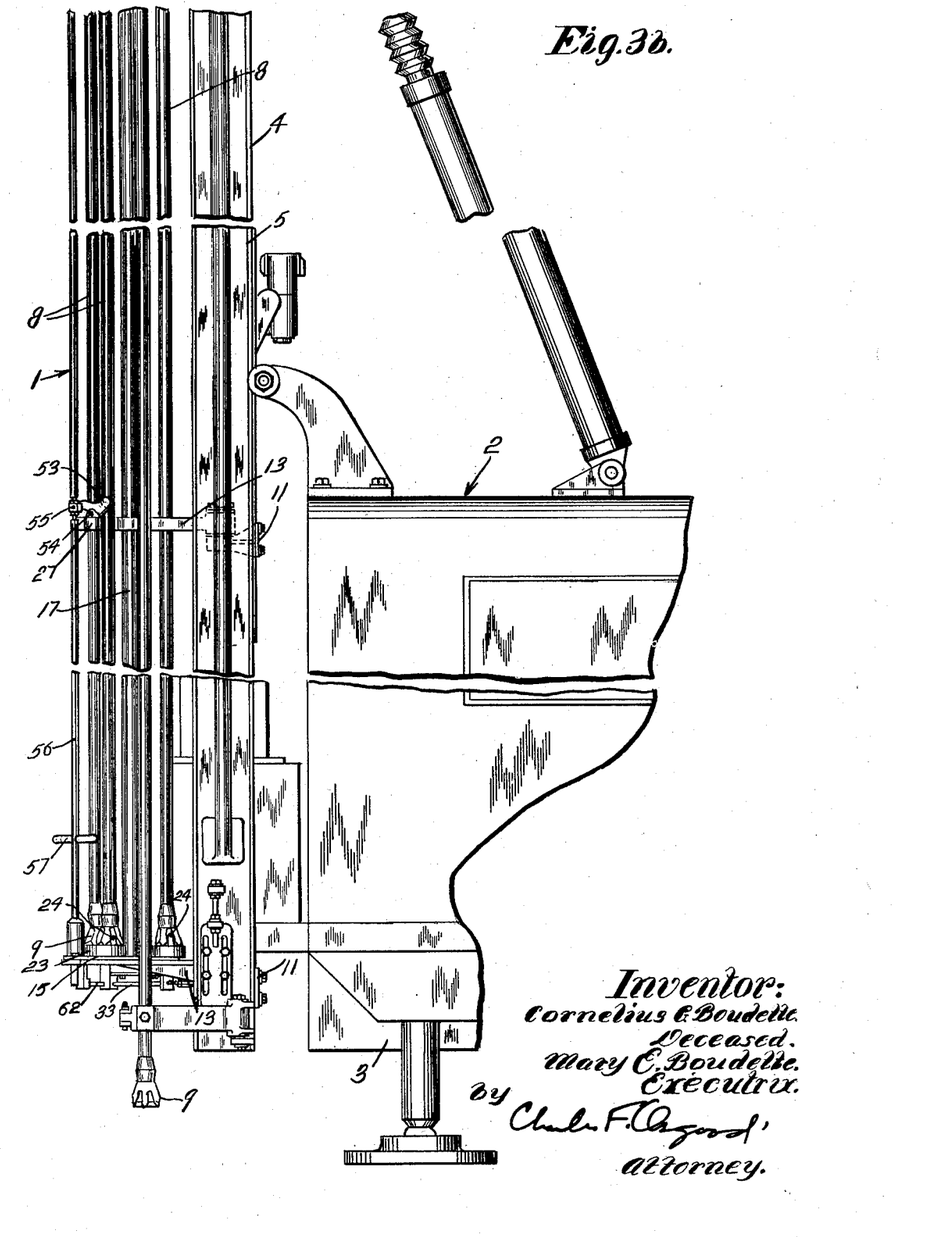
Figure 4:
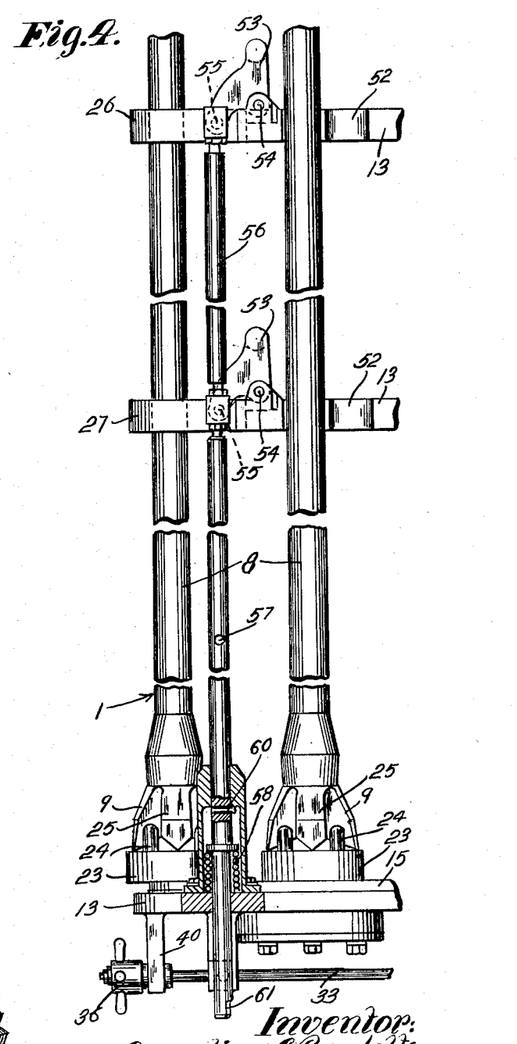
Fig. 4 is a detail side view of the loading device, showing the latch means in vertical section.

In Fig. 1, in full lines, and in Figs. 6 and 13, the rotary rack is shown in loading position, and the elongated drill steels may be lifted into position on the rack by means of a power hoist or winch 70 (Fig. 2c) on the drilling machine. The swinging arms 13 are locked by the latch 31 in loading position and the gates 54 at this time are disposed in their open position as shown in Fig. 4. The upper and intermediate disks of the rack are notched at 71, at spaced points about their peripheral edges (Figs. 13 and 15), to receive the four drill steels, when the latter are properly positioned on the rest pads of the lower turntable plate of the rack.

When it is desired to add a drill steel section to the drill string of the drilling machine, the drill steel of the rock drilling tool 6 may be detached from the tool chuck and the tool may be raised along its guide 5 into its uppermost retracted position. The operator may then manipulate the handles 36 and 47 to release the arm latch 31 so that the rack may be swung horizontally from the full line position shown in Fig. 1 to the dotted line position in that figure. The rotary rack has, of course, previously been turned about its own axis relative to the arms 13 so that a drill steel is always in position, when the rack assumes the dotted line position in Fig. 1, to locate a drill steel in alignment with the drill string, in a well known manner. The cable of the hoist 70 may then be attached to the upper end of the drill steel section to be added to raise the drill steel section from the turntable-pad and since the gates 53 are open, the rack may be swung outwardly relative to the drill steel with the steel moving through the open sides 28 of the retaining rings as the rack is swung outwardly.

The plunger lock 41 may then be lowered to release the same from the turntable-lock 43, and the rack-turntable 15 may be rotated to bring the next adjacent drill steel into position with respect to the ring openings so that it may next be unloaded when desired. The interlock between the gate-lock and the arm-lock prevents swinging of the rack when the gates are open, and when the gates are moved to closed position the arm-lock is freed so that it may be released to permit arm-swing. The turntable-lock may be released at will by manipulation of the handle 47 to position the lock to permit rotation of the rack about its own axis relative to the arms 13.

As a result of this invention an improved article supporting and handling device is provided whereby articles may be stored in a relatively compact manner and may readily be moved into unloading position when desired. By the provision of the rotary rack having retaining rings provided with open sides controlled by releasable gates the drill steels may be readily loaded onto the rack and may readily be removed from the rack. The improved locking means for the several movable parts of the loading device reduces substantially the possibility of the drill steels inadvertently falling from the rack, and by the provision of the locking device for the parts rotation of the rack about its own axis may be precluded when the rack-supporting arms are unlocked and free to swing. The loading device is rugged and relatively compact in design and may be applied to a conventional drilling machine with a minimum of change. These and other advantages of the invention will be clearly apparent to those skilled in the art.

While there are in this application specifically described one form and a modification which the invention may assume in practice, it will be understood that this form and modification of the same are shown for purposes of illustration and that the invention may be modified and embodied in various other forms without departing from its spirit or the scope of the appended claims.

What is claimed as new and desired to secure by Letters Patent is:

1. In an article storing and handling device, a swingable support, a rotary rack mounted on said support to turn about its own axis relative thereto for receiving a load of articles to be stored, and an annular retaining ring on said support in coaxial relation with and surrounding said rack and relative to which said rack is rotatable, said ring having but a single relatively narrow open side through which all the articles must move as they pass to and from the rack, a releasable gate, means for mounting said gate on said annulus in proximity to said open side for opening and closing said ring opening, said annular ring when said gate is closed serving to retain the articles on said rack as the latter rotates relative thereto, and operator controlled means for moving said gate on said mounting means selectively into open and closed positions with respect to said open side of said retaining ring.

2. An article storing and handling device, a swingable arm structure pivoted at one end, a rotary article receiving rack journaled on the outer end of said arm structure to turn about its own axis relative thereto parallel to its pivot, an annular retaining ring on said arm structure in coaxial relation with and surrounding said rack and relative to which said rack is rotatable for retaining the articles within said rack, said ring having but a single relatively narrow open side through which all the articles must pass as they are moved onto or off from said rack, a releasable closure member, means for mounting said closure member on said ring in proximity to said open side for opening and closing said open side of said ring, said ring when said closure member is closed retaining the articles in stored position on said rack as the latter rotates relative thereto, and operator controlled means for moving said closure member on its mounting means selectively into its closed and open positions with respect to said open side of said retaining ring.

3. An article storing and handling device as set forth in claim 2 wherein a plurality of releasable locking means are provided including one for locking said rack against rotation about its own axis relative to said arm structure and another for locking said arm structure against swinging movement about its pivot when said closure member is in open position.

4. An article storing and handling device as set forth in claim 3 wherein mechanical interlocking means is provided between said closure-member-moving means and said arm-structure lock for precluding swinging of said arm structure about its pivot whenever said closure member is in open position.

5. In combination, a support, an arm pivotally mounted on said support to swing horizontally relative thereto, a rotary rack journaled on the outer portion of said arm to turn relative thereto about a vertical axis parallel with the arm pivot axis, means including a shiftable locking element for locking said arm against swinging movement, means including a shiftable locking element for locking said rack against rotation about its own axis relative to said arm, and operator controlled means for selectively shifting said locking elements into their locking and released positions.

6. A combination as set forth in claim 5 wherein gate means is provided for said rack for controlling addition of articles to or removal of articles from said rack, means for shifting said gate means including a shiftable element, and locking means serves to lock said shiftable element of said gate means against release when said shiftable element of said arm locking means is released and said arm is free to swing.

7. In combination, a support, an arm pivotally mounted on said support to swing horizontally relative thereto, a rotary rack journaled on said arm to turn relative thereto about a vertical axis, means for locking said arm against swinging movement, means for locking said rack against rotation about its own axis relative to said arm, gate means on said rack for controlling addition of articles to or removal of articles from said rack, and locking means to lock said gate means against release during swinging of said arm, said arm locking means including an operating rod extending radially with respect to the arm pivot axis, and said lock for said gate means includes an operating rod having locking engagement with said first mentioned operating rod.

8. A supporting and storing device for rock drill steels, a swinging support, a rotary rack journaled on the outer end of said support for receiving a load of drill steels, the axis of rotation of said rack being parallel with the pivotal axis of said support, and vertically spaced upper and lower retaining means on said swinging support and relative to which said rack is rotatable for retaining the drill steels on said rack against lateral release therefrom as said rack rotates relative to said retaining means.

9. A supporting and storing device as set forth in claim 8 wherein said retaining means includes a retaining annulus coaxial with and surrounding said rack, said annulus having but a single narrow opening at one side through which all the drill steels must pass as they are moved laterally onto and from said rack, and releasable gate means is provided for closing the side opening of said retaining annulus and movable between open and closed positions.

10. In combination, a horizontally swingable arm pivoted at one end, a rotary article receiving rack journaled on the outer portion of said arm to turn about an axis parallel with the arm pivot axis, means carried by said arm and relative to which said rack is rotatable for retaining the articles in position on said rack, a releasable lock for retaining the articles on said rack, a releasable lock for said arm for locking the latter against swinging movement, and a releasable lock for said retaining means for holding the latter in retaining position, each of said locks including a shiftable locking element and operator controlled means for shifting said locking element.

11. In combination, a horizontally swingable arm structure, a rotary article receiving rack journaled on the outer portion of said arm structure, means for retaining the articles in position on said rack, a releasable lock for said rack, a releasable lock for said arm, a releasable lock for said retaining means, each of said locks including a shiftable locking element and means for shifting said locking element, and means providing an interlock arranged between said shiftable locking elements of said arm-lock and said lock for said retaining means to preclude swinging of said arm when said retaining means is in inoperative position and its locking element is released.

12. In combination, a horizontally swingable arm structure pivoted at one end, a rotary device for receiving a load of articles to be stored and journaled on the outer end of said arm structure to rotate about its own vertical axis relative to said arm with said vertical axis parallel with the arm structure pivot axis, a retaining means on said support and relative to which said rotary device is rotatable for retaining the articles on said rack, said retaining means including a shiftable retaining member movable between retaining and releasing positions, a shiftable lock for said arm for locking the latter against swinging movement, a shiftable lock for said rotary device for locking the latter against rotation about its own axis, a shiftable lock for said retaining member for locking the latter in article retaining position, and operator controlled means for selectively shifting said locks.

13. In combination, a horizontally swingable arm, a rotary device for receiving a load of articles to be stored and journaled on said arm to rotate about its own vertical axis relative to said arm, a retaining means on said support and relative to which said rotary device is rotatable for retaining the articles on said rack, said retaining means including a shiftable retaining member movable between retaining and releasing positions, a shiftable lock for said arm for locking the latter against swinging movement, a shiftable lock for said rotary device for locking the latter against rotation about its own axis, a shiftable lock for said retaining member for locking the latter in article retaining position, and means providing an interlock arranged between said lock for said retaining member and said lock for said arm whereby when one of said last mentioned locks is operative the other is released.

14. In combination, a horizontally swingable arm, a rotary article receiving rack journaled on the outer portion of said arm to turn about an upright axis relative thereto, releasable locking means for retaining the articles in position on said rack and releasable to permit removal of the articles from said rack, means for locking said arm against swinging movement about its pivot, means for locking said rack against rotation relative to said arm, and an interlocking connection between said second and third mentioned locking means whereby said locking means for said retaining means is held against release until said rack locking means is in locking position.

15. A combination as set forth in claim 14 wherein said interlocking means includes a shiftable element extending between and engaging elements of both of said second and third mentioned locking means.

16. A combination as set forth in claim 15 wherein said second and third mentioned locking means comprises shiftable rods and said shiftable element of said interlocking means extends between and engages said shiftable rods.

17. A combination as set forth in claim 16 wherein one of said shiftable rods extends vertically in parallelism with the axis of rotation of said rack.

18. A combination as set forth in claim 17 wherein said other rod is arranged with its axis horizontal.

19. In combination, an article receiving rack, means for mounting said rack for movement about an upright axis, releasable means for retaining an article in position on said rack including a shiftable element releasable to permit removal of the article from said rack, means including a shiftable locking element for holding said rack against movement about said upright axis, and interlocking means extending between and engaging shiftable elements for maintaining one of the latter in locking position whenever the other is released.

References Cited in the file of this patent

UNITED STATES PATENTS

| | | |
|---|---|---|
| 531,257 | Bond | Dec. 18, 1894 |
| 722,514 | Johnson | Mar. 10, 1903 |
| 1,242,305 | Arey | Oct. 19, 1917 |
| 1,477,063 | Kind | Dec. 11, 1923 |
| 2,526,245 | Lathrop | Oct. 17, 1950 |
| 2,806,711 | Jacobs | Sept. 17, 1957 |

FOREIGN PATENTS

| | | |
|---|---|---|
| 595,628 | Great Britain | Dec. 11, 1947 |